Aug. 4, 1959

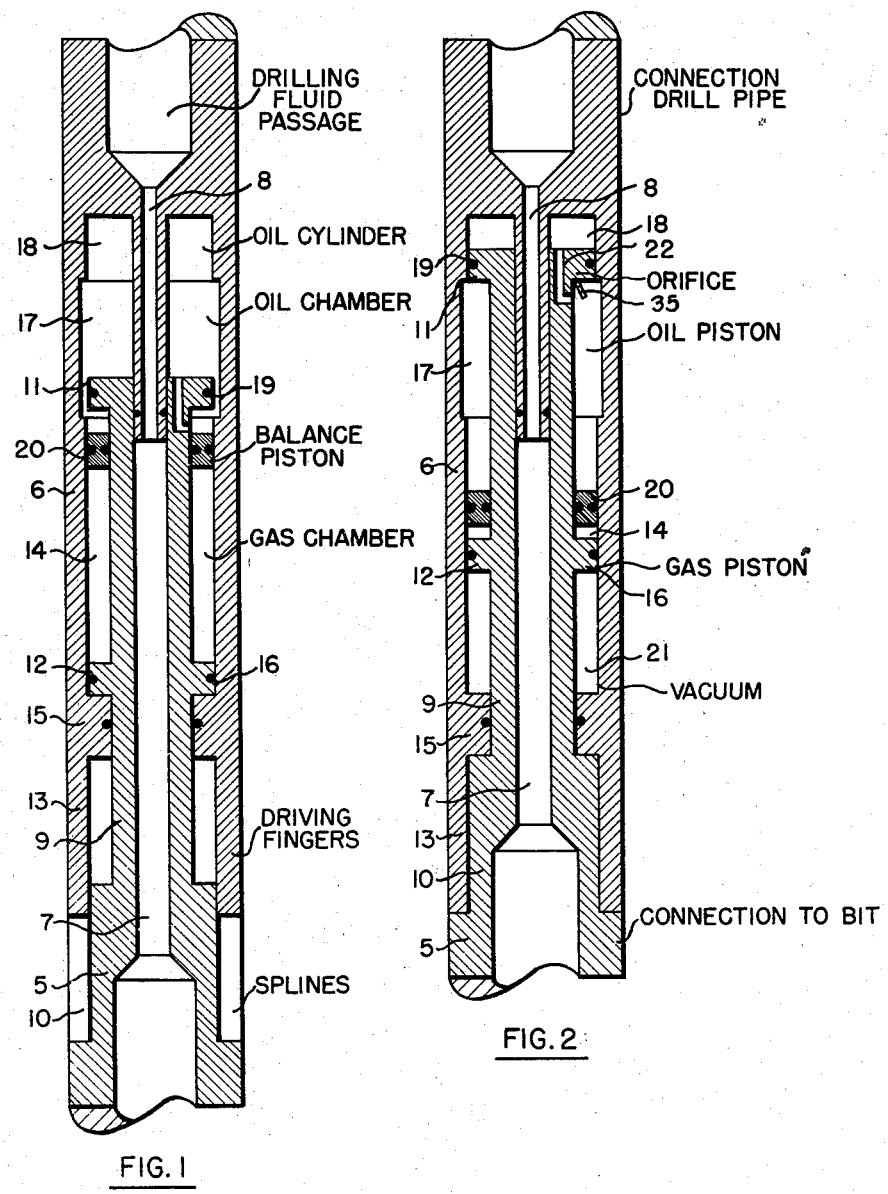

J. E. ECKEL ET AL 2,898,084

SEISMIC SHOCK SOURCE

Filed Dec. 16, 1954

John E. Eckel
John M. Camp        Inventors

By *W. N. Wright*   Attorney

John M. Camp
John E. Eckel   Inventors

United States Patent Office 2,898,084
Patented Aug. 4, 1959

2,898,084

SEISMIC SHOCK SOURCE

John E. Eckel and John M. Camp, Tulsa, Okla., assignors, by mesne assignments, to Jersey Production Research Company Application December 16, 1954, Serial No. 475,632

4 Claims. (Cl. 255—1)

The present invention is concerned with a method and apparatus for generating seismic impulses. It particularly relates to means for determining the velocity of sound through the low velocity layer that lies adjacent the earth's surface. It also particularly relates to means for determining the depth of the low velocity layer. The invention especially concerns a gas energized seismic impulse source for use in conjunction with shot hole drilling apparatus and procedures.

The use of seismic impulses by geologists for studying the earth's substrata is well known. In general an artificial disturbance is set up at or below the earth's surface, and sensitive detection devices are placed in the vicinity of the disturbance to detect and indicate the resulting earth tremors at various positions in the area. By measuring the time intervals between the initiation of the seismic impulses and the reception of the tremors at each one of the detection devices it is possible to learn a great deal about the nature and structure of the earth's substrata.

The use of seismic procedures has found particular application in prospecting for oil. Here the procedures are directed toward the location of underground formations that are indicative of the existance of subterranean oil reservoirs.

In employing seismic methods in the search for oil, a common practice consists in drilling a so-called "shot" hole which is ordinarily drilled to a depth sufficient to obtain a good seismic record. A normal shot hole is about 100 feet deep but on occasion may be as shallow as about 50 feet or as deep as about 250 feet.

As the shot hole is drilled, it is also a common practice to periodically interrupt the drilling operation and to detonate a small charge of dynamite or other suitable explosive at each one of the depth levels. By recording the earth tremors in the vicinity of the shot hole, it is thus possible to obtain a considerable amount of valuable information concerning the substrata in that particular area. This information is of particular value when the near surface strata are of such nature as to make difficult seismic communication with deeper strata. This procedure, of course, requires that the drill and drill string be entirely removed from the shot hole each time that it is desired to detonate an explosive charge in the hole. It is apparent then that the seismic procedure in this instance requires interruption of the drilling operation, a feature that is undesirable in that it represents a substantial loss both in time and money.

Accordingly it is an object of the present invention to improve on the present shot hole seismic practice by providing means for generating seismic impulses that do not require withdrawal of drilling apparatus from the hole. It is a further objective of the invention to provide a seismic impulse means that eliminates the necessity for using explosive charges in this type of operation. It is a particular object of the invention to provide mechanical means for generating seismic impulses which precludes the necessity for withdrawing drilling apparatus from a shot hole.

The objectives of the invention are realized by utilizing a conventional, rotary-type drilling apparatus which is provided with a telescoping, normally extended section within the drill string. The drill string in turn is provided with a compressible, elastic body which is adapted to be highly compressed when the drill string and its attendant section are telescoped into a contracted position. The apparatus is subsequently released at a predetermined moment and the drill string rapidly returned to its extended position. By adjusting the position of the apparatus just above the bottom of the hole, it is possible to utilize the return stroke of the drill string to impart a shock to the bottom of the hole. And by synchronizing the release of the drill string with suitable seismic detection apparatus, it is possible to detect and record the seismic waves that are transmitted through the earth by the shock.

The objectives of the invention are contemplated to be best realized by employing a gas energized seismic impulse source which is preferably an integral part of the drill string. In other words seismic impulses are generated in accordance with the present invention by mechanically compressing a volume of gas and thereafter utilizing the energy of the compressed gas to deliver a seismic shock to the bottom of a shot hole. The energy within the compressed gas may be released in several different ways as for example by electrical or mechanical means. It is preferably, however, released by hydraulic means as will be discussed in detail later in this description.

In an apparatus embodiment, the invention utilizes two substantially cylindrical members, one of said members fitting and moving longitudinally inside the other member. The exposed end of one of the members is attached to the upper end of the drill string in a shot hole, and the exposed end of the other member is attached to the lower portion of the drill string in a shot hole. Indeed, the impulse device is preferably inserted in the drill string immediately above the drill bit.

The inner and outer cylindrical members of the present apparatus are interiorly designed to provide an enclosed chamber which is filled with gas. This chamber is further designed to experience a reduction in volume as the inner member is driven within the outer member. Thus, gas that is stored within the chamber is greatly compressed and becomes a reservoir possessing tremendous energy.

The apparatus is further provided with suitable mechanical, electrical, pneumatic or hydraulic means for cocking and triggering the inner member within the outer member. The triggering mechanism is further provided with suitable timing means for releasing the inner member at any given desired time. The timing means is a vital feature of the apparatus since any seismic impulse must be accurately coordinated with the recording of the signals that are generated by the seismic detectors referred to earlier. In this connection it will be noted that it is conventional practice in seismic prospecting methods to record the signals of these detectors on a suitable record such as a sheet of photographic film. It therefore follows that the timing of the seismic impulses and the coordination of the impulses with the operation of the recording device is necessary in order to conserve on the use of the recording film and the like.

The present invention may be better understood and presented by reference to the accompanying drawings.

Figure 1 illustrates in vertical cross section an impulse source which constitutes a preferred apparatus and embodiment of the invention. Figure 1 illustrates the apparatus in the uncocked position.

Figure 2 illustrates the same apparatus as is shown in Figure 1, but in this instance the apparatus is illustrated in the cocked position.

Figure 4:
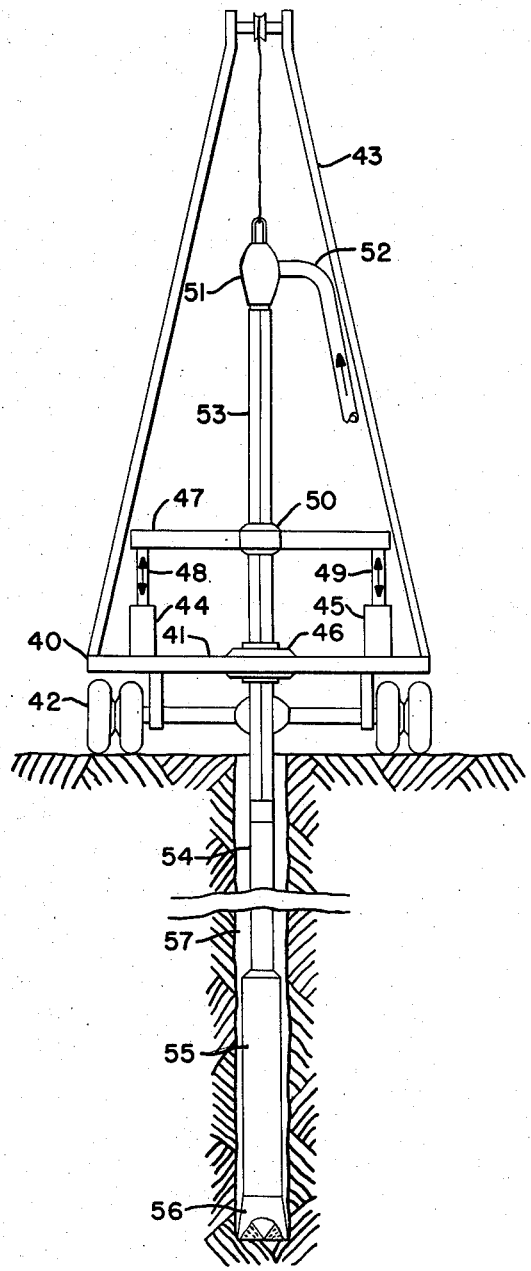
Figure 4 is a schematic illustration of a shot-hole drilling apparatus embodiment of this invention as it would appear within a borehole.

Turning now to Figure 1 it may be seen that the apparatus illustrated therein includes an inner member 5 and an outer member 6. The inner member 5 is connected as by means of a suitable threaded or welded connection to a drill bit not shown; and the upper end of the outer member is similarly connected to the lower end of the drill string—also not shown. The drill bit and the drill string are illustrated in Figure 4.

Inner member 5 and outer member 6 are provided with conduits 7 and 8 respectively which extend centrally and longitudinally through the members. These conduits provide passageway for the flow of drilling fluid from the earth's surface through the drill string and thence to the drill bit.

The inner member 5 includes a body portion 9, a splined portion 10 at the lower end of the body portion, a piston-type flange 11 at the upper end of the body portion and a second piston-type flange 12 at a position longitudinally intermediate flange 11 and splined portion 10. The entire peripheral surface of the flanged portions must be smooth to provide good bearing surfaces for a reason to be brought out later. The outer flange member 11 is also provided with a small diameter fluid orifice passageway 22 which extends from the upper surface of the flange to the exterior peripheral surface of the body portion substantially immediately below the flange.

Outer member 6 is also provided at its lower end with a splined portion 13 which is adapted to mesh with the splined portion 10 of the inner member. This arrangement enables the outer member, which is attached to the drill string, to transmit torque and rotary motion to the inner member which in turn is attached to the drill bit.

Outer member 6 is further provided with recessed gas cylinder 14 which is positioned vertically above the splined portion 13 and which is separated from the splined portion by a shoulder 15. Cylinder 14 is provided with an inner diameter which is larger than that of the laterally corresponding portion of the body portion 9 and therefore forms an annular space therebetween. Furthermore, the inner peripheral surface of gas cylinder 14 is of a character to form a close sliding fit with the outer peripheral surface of flange member 12. In effect therefore flange member 12 is a piston adapted to move up and down within cylinder 14. Suitable sealing means 16 are provided to maintain a fluid tight relationship between this piston and the cylinder. Suitable means for this purpose include conventional O-rings, packing rings, and the like.

Immediately above the gas cylinder 14 is a recessed chamber 17 which is adapted to be filled with a liquid such as water, oil, and the like. A preferred liquid for use in this chamber is a mineral oil having a viscosity suited to the desired time delay between cocking and firing time.

Immediately above chamber 17 is a cylindrical chamber 18 which has a smaller interior diameter than chamber 17. Chamber 18 like chamber 17 is also filled with liquid.

The interior diameter of cylindrical chamber 18 is such as to provide a very close sliding fit with the outer peripheral surface of flange member 11. Indeed, as in the case of flange member 12 and chamber 14, flange 11 is adapted to act as a close-fitting piston sliding vertically up and down within a cylinder 18. And also as in the case of the previous piston and cylinder, it is necessary that piston 11 and cylinder 18 form a fluid tight relationship therebetween. To assist in obtaining this relationship, suitable sealing devices such as O-rings 19 are provided in the outer peripheral surface of the piston. The relative positions of piston 11 and cylinder 18 with respect to each other are fixed so that the piston is driven up and into the cylinder when inner member 5 is mechanically forced within outer member 6. This condition is illustrated in Figure 2.

Pistons or flanges 11 and 12 are also positioned vertically relative to one another so that the lower shoulder of flange 12 engages the upper surface of shoulder 15 and so that flange 11 remains within chamber 17 when the overall apparatus is in the extended position. This arrangement is illustrated particularly well in Figure 1.

A balance piston 20 is also provided in the annular space between the outer surface of the body portion 9 of inner member 5 and the inner surface of cylinder 14 of outer member 6. This piston is a free floating piston in that it is free to move in a vertical direction within the aforementioned annular space. The piston is preferably provided with suitable sealing means as indicated to maintain a fluid tight relationship separating cylinder 14 from hydraulic chamber 17.

By being capable of movement, balance piston 20 compensates for the added solid volume which is introduced within the chambers 17 and 18 when the inner member 5 is driven up within the outer member 6. It is apparent that the liquid within the two chambers is substantially incompressible and therefore additional space or volume is required when the overall apparatus is driven together. Vertical downward movement of balance piston 20 within gas cylinder 14 provides this added necessary volume.

The apparatus of Figures 1 and 2 may be even better understood by considering how the apparatus functions. For this purpose, it will be assumed that the apparatus is in the extended position and that a drilling operation has been temporarily interrupted for the purpose of making a seismic observation. Thus, it may be considered that the drilling apparatus shown in Figure 4 is in this very condition. The apparatus in that figure comprises a rig for drilling shot holes and includes a truck 40, having a platform 41 and wheels 42. The truck is shown in a rear-view manner; and the cab, motor, and other equipment are not illustrated. Mounted on the truck is mast structure 43, hydraulic cylinders 44 and 45, and drill rotating mechanism 46. A yoke 47 connects the upper ends of the pistons 48 and 49 which fit within the two cylinders. The rotating mechanism 46 is driven by means of a suitable power source and transmission system not shown.

A clutch 50 is mounted on yoke 47. A suitable kelly or other drive rod 53 is positioned within the rotating mechanism 46 and extends through clutch 50 to swivel 51, which is connected to a drilling-fluid supply system 52. The entire yoke, swivel, and kelly assembly is vertically movable in both directions in response to movements of the hydraulic cylinders. Hydraulic power is supplied to the hydraulic cylinders by conventional means not illustarted in the figure.

Connected to the lower end of the kelly 53 is a string of drill pipe 54. The pneumatic ram or shock assembly 55 is connected within the drill string, and a conventional bit 56 is supported at the lower end of the string. Drilling fluid may be circulated in a conventional manner down through the drill string and upward within the annulus of the borehole 57.

To generate a seismic shock with the apparatus in Figure 4, weight is imposed on the lower end of the drill string by reducing the amount of weight carried by the surface drilling apparatus to less than that carried during normal drilling operations. This transmits additional weight of the drill pipe string to its lower end. This may be supplemented by the pull-down or snubbing devices 44 and 45 at the surface. This added weight forces the inner member 5 and the outer member 6 to be driven together until piston 11 is forced up within cylinder 18. During this operation the gas within chamber 14 is greatly compressed by the upward movement of piston 12. The upward movement of piston 12 in turn also causes the formation of a low pressure or vacuum condition in the annular space immediately below the piston. This low pressure zone is indicated by the numeral 21 in Figure 2. Upon being driven into cylinder 18, piston 11 causes oil to be driven from that piston through orifice 22 into chamber 17. Orifice 22 is preferably of a character to permit a ready flow of the liquid in this direction. Thus, this passageway may be provided with a check valve such as swing check valve 35 in Figure 2 which permits a free flow in this direction and a restricted flow in the opposite direction. The added volume of oil within chamber 17 is compensated for by a downward movement of piston 20 as explained earlier.

The maximum movement of the inner member 5 within the outer member 6 is limited by the shoulders that form a part of the splined portions of each of the members.

At the completion of the cocking or contraction step, the inner member 5 is driven entirely within the outer member 6, and the reverse movement of the two members is prevented so long as exterior force is applied. Once the exterior force is removed, by lifting the drill string to remove contact of the bit with the hole bottom, the compressed gas within cylinder 14 endeavors to return the inner member 5 to the extended position. This effort of the compressed gas, however, is restrained by the fact that liquid within chamber 17 must flow through orifice and passageway 22 back to cylinder 18 before return movement of the inner member 5 can be realized. Orifice passageway 22 therefore constitutes both the triggering and timing means within the apparatus of Figures 1 and 2. By properly sizing the orifice, it is possible to very precisely time the actual firing or release of the inner member 5.

It will be appreciated that inner member 5 moves slowly outward from its innermost position within member 6 so long as liquid continues to seep through the orifice connection 22 into cylinder 18. Once the upper surface of piston 19 is clear of cylinder 18, however, it is equally apparent that the restraining force which prevents the compressed gas from driving member 5 in a downward direction and out from within member 6 no longer exists. At this point, then, the movement of member 5 becomes very rapid and is characterized by a tremendous thrust which is imparted via the drill bit 56 to the bottom of the shot hole. In this connection it will be noted that the entire assembly of Figure 4—i.e. the drill bit, the seismic source and the drill string—must be elevated after cocking the seismic source to a position slightly above the bottom of the shot hole. It is particularly desired that this distance be slightly less than the length of the stroke of the seismic source.

By knowing the time delay that is imparted to the firing of the apparatus by the orifice connection 22, it is possible to accurately coordinate the firing time with the start of the recording apparatus which is used at the earth's surface to record the tremors that in turn are indicated upon the seismic detectors.

Figure 3:
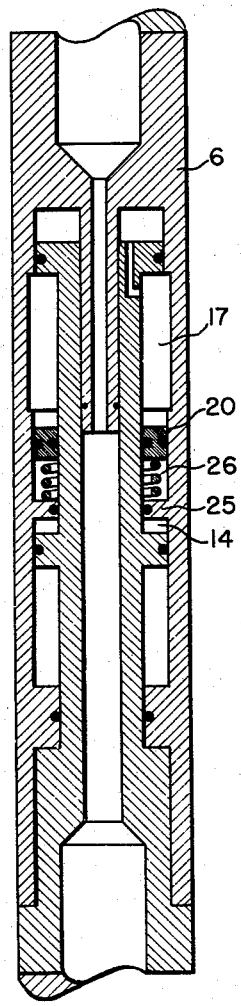
Figure 3 illustrates still another apparatus embodiment of the invention which is particularly adapted to maintain the pressure of the compressed gas at a constant value while the apparatus is in the cocked position. The apparatus in this figure is depicted in the cocked position.

Another embodiment of the invention is illustrated in Figure 3. This embodiment differs from the embodiment of Figures 1 and 2 in that it utilizes an additional fixed shoulder 25 on the outer member 6 defining the upper boundary of the gas chamber or cylinder 14. The floating piston 20 is positioned within oil chamber 17 vertically above the shoulder 25.

In this embodiment a resilient member such as a coiled spring 26 may be positioned vertically intermediate the piston 20 and the shoulder 25. Thus, liquid within chamber 17 is once more free to move downward within the chamber and to depress piston 20 against spring 26. In this way, as also in Figure 2, added liquid volume is provided within chamber 17. In addition, one disadvantage inherent in the more simplified apparatus of Figures 1 and 2, is avoided. This slight disadvantage in the latter apparatus results from the fact that the gas, which is compressed within cylinder 14 of the apparatus of Figures 1 and 2, must supply the energy to maintain the liquid in chamber 17 under pressure and therefore tends to lose a small amount of pressure as piston 11 gradually moves downwardly within cylinder 18 immediately before firing time. The presence of the fixed shoulder 25 in the apparatus of Figure 3 in combination with the energy supplied by the spring 26, avoids this lessening in the pressure of the compressed gas. Small stops may be provided above floating piston 20 to prevent any undue upward movement of this piston when the apparatus is fired.

It will be realized that the present invention is not to be limited by the particular embodiments that have just been described. Thus, it will be appreciated that mechanical means such as latches and the like may be used to retain the apparatus in the cocked position until firing time—at which time the latches or other devices may be released. Furthermore, it may be desirable in some instances to use a compressive device such as a spring, alone or in combination with compressed gas, to generate the necessary thrust in the present invention. It has been observed, however, that compressed gas alone is generally preferred for the purposes of the invention.

It will also be appreciated that the various portions of the apparatus may possess shapes other than cylindrical ones, so long as a consistent interior relationship exists between them.

It will further be realize that the apparatu may be constructed in a variety of sizes and may be adapted to provide a wide range of thrust magnitudes. In one test utilizing an apparatus that corresponded in general to the construction of the apparatus of Figures 1 and 2, it was possible to attain seismic shocks equivalent in magnitude to the shocks that are attained with about 1/32 pound of dynamite. The apparatus in this instance had an outside diameter of about three inches and a stroke of about eighteen inches. The apparatus was cocked at the bottom of a 364 foot hole by imposing a load of about 8000 pounds at the top of the drill string. Once the instrument was cocked, the entire drill string, drill bit and instrument were raised off the bottom of the hole a distance of about three inches.

The shocks imparted to the earth by the instrument were recorded by using conventional electromagnetic-type velocity detectors or geophones. These detectors are used in both reflection type and refraction type seismic procedures. In every case, it was found that the apparatus being tested provided seismic shocks that were equivalent to about 1/32 pound of dynamite. Thus, it is apparent that the present apparatus has a ready application in seismic prospecting, particularly for obtaining information relative to the low velocity layer. The apparatus affords particular advantages over presently conventional shot hole seismic procedures where it is necessary to remove the drill string and the drill bit from the shot hole each time it is desired to set off an explosive charge for seismic purposes. With the present apparatus it is not necessary to remove the drilling apparatus from the hole nor is it necessary to employ explosive charges.

What is claimed is:

1. A rotary drilling apparatus for drilling a shot hole and for generating a seismic shock at the bottom of the hole which includes a drill string, a drill bit adapted to be driven by said drill string, a hydraulically-timed pneumatic ram assembly in said drill string above said drill bit, said ram assembly comprising a first member attached to said drill bit, a second member attached to said drill string, said first member being adapted to extend and slide within said second member and to rotate in unison with said second member, conduit means throughout both members adapted to transmit drilling fluid from the drill string to the drilling bit, said second member containing a first liquid-filled cylinder superposed on and in direct communication with a liquid-filled chamber, said chamber being of larger diameter than said first cylinder and superposed on a second gas-filled cylinder, a first piston attached to said first member and fitted to move vertically within said gas-filled cylinder, a second piston attached to said first member and arranged to be fitted within the liquid-filled cylinder when said first member is forced within said second member and to be otherwise positioned within said chamber, a free-floating piston surrounding said first member and arranged to separate liquid within said liquid-filled chamber from the gas within said gas-filled cylinder, means to force said first member up within said second member and to force said second piston within said liquid-filled cylinder whereby said first piston simultaneously compresses gas within said gas-filled cylinder, conduit means providing ready flow of liquid from said first cylinder into said chamber during the compression step and providing a restricted and predetermined flow of liquid from said chamber to said first cylinder when the compressive force is removed.

2. An apparatus as defined in claim 1 in which the first and second members are provided with spline means adapted to rotate the two members in unison.

3. In a method of drilling a shot hole with a rotary-type drilling apparatus the method of seismic prospecting which comprises providing the drill string with a highly resilient telescoping section, interrupting the drilling operation, forcing the drill bit against the bottom of the hole whereby the telescoping section is pushed into a contracted position, locking the section in the contracted position, lifting the drill bit slightly off the bottom of the hole, releasing the section from its contracted position whereby the drill bit is driven against the bottom of the bore hole with a shock, and detecting seismic waves produced by the shock.

4. A combination rotary-type drilling and seismic impulse apparatus comprising a string of drill pipe and a drill bit attached to the lower end thereof, a telescoping section interposed within said drill string, said section comprising two telescoping members co-rotatably attached at their outer ends to said drill string, a passageway for the flow of fluids extending through said section, a compressible elastic body within said section and interposed between said telescoping members, means to retain said compressible elastic body under compression upon telescoping of said members into a collapsed condition and means to release said elastic body from compression whereby said members are urged from a collapsed condition to an extended condition in response thereto whereby a severe downward jar is imparted to the drill bit.

References Cited in the file of this patent

UNITED STATES PATENTS

| | | |
|---|---|---|
| 1,804,700 | Maxwell | May 12, 1931 |
| 1,861,042 | Zublin | May 31, 1932 |
| 2,265,431 | Kerr | Dec. 9, 1941 |
| 2,424,108 | Merten | July 15, 1947 |
| 2,634,102 | Howard | Apr. 7, 1953 |
| 2,645,459 | Sutliff | July 14, 1953 |
| 2,660,984 | Zumwalt | Dec. 1, 1953 |
| 2,721,056 | Storm | Oct. 18, 1955 |